US012030387B2

United States Patent
Araujo Xavier et al.

(10) Patent No.: US 12,030,387 B2
(45) Date of Patent: Jul. 9, 2024

(54) ELECTRIFIED VEHICLE CONTROL USING BATTERY ELECTROCHEMICAL EQUILIBRIUM BASED STATE OF CHARGE AND POWER CAPABILITY ESTIMATES

(71) Applicant: Ford Global Technologies, LLC, Dearborn, MI (US)

(72) Inventors: Marcelo Araujo Xavier, Belleville, MI (US); Gabrielle Vuylsteke, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 419 days.

(21) Appl. No.: 17/143,298

(22) Filed: Jan. 7, 2021

(65) Prior Publication Data
US 2022/0212545 A1 Jul. 7, 2022

(51) Int. Cl.
*B60L 15/20* (2006.01)
*B60L 50/60* (2019.01)
*B60L 58/12* (2019.01)

(52) U.S. Cl.
CPC ............... *B60L 15/20* (2013.01); *B60L 50/60* (2019.02); *B60L 58/12* (2019.02); *B60L 2240/545* (2013.01)

(58) Field of Classification Search
CPC .......... B60L 15/20; B60L 50/60; B60L 58/12; B60L 2240/545; B60L 58/14;
(Continued)

(56) References Cited

U.S. PATENT DOCUMENTS 8,332,342 B1    12/2012   Saha et al.
9,575,128 B2    2/2017    Frost et al.
(Continued)

FOREIGN PATENT DOCUMENTS

GB    2532726 A    6/2016

OTHER PUBLICATIONS

Zhang R, Xia B, Li B, Cao L, Lai Y, Zheng W, Wang H, Wang W, Wang M. A Study on the Open Circuit Voltage and State of Charge Characterization of High Capacity Lithium-Ion Battery Under Different Temperature. Energies. 2018; 11(9):2408. https://doi.org/10.3390/en11092408 (Year: 2018).*

*Primary Examiner* — Alan D Hutchinson
(74) *Attorney, Agent, or Firm* — David B. Kelly; Brooks Kushman PC

(57) ABSTRACT

A vehicle, system, and control method include a traction battery having a plurality of cells, a temperature sensor configured to measure battery temperature of the traction battery, an electric machine powered by the traction battery and configured to provide propulsive power to the vehicle, and a controller configured to control at least one of the electric machine and the traction battery using an estimated battery power capability or estimated battery state of charge based on battery parameters initialized upon requesting activation of the traction battery with an open circuit voltage that varies based on elapsed time from the traction battery becoming inactive. The open circuit voltage may be estimated using parameters including a first resistance, a second resistance in series with the first resistance, and a capacitance in parallel with voltage across the capacitance initialized based on an exponential function of the elapsed time.

20 Claims, 4 Drawing Sheets

(58) Field of Classification Search
CPC ............ B60L 2240/547; B60L 2240/80; H02J 7/0048; H02J 7/007194
See application file for complete search history.

(56) References Cited

U.S. PATENT DOCUMENTS

| | | |
|---|---|---|
| 9,718,455 B2 | 8/2017 | Yu et al. |
| 2021/0336462 A1* | 10/2021 | Wang .................... G01R 31/396 |
| 2021/0339650 A1* | 11/2021 | Hashimoto ............. B60L 58/12 |
| 2021/0376637 A1* | 12/2021 | Dong ................... G01R 31/389 |

* cited by examiner

ELECTRIFIED VEHICLE CONTROL USING BATTERY ELECTROCHEMICAL EQUILIBRIUM BASED STATE OF CHARGE AND POWER CAPABILITY ESTIMATES

TECHNICAL FIELD

This disclosure relates to an electric vehicle and control strategy using a battery state of charge and power capability estimation strategy to account for voltage decay associated with battery diffusion processes.

BACKGROUND

Battery electric vehicles (BEVs) are gaining popularity as OEMs offer models with longer ranges, which may decrease range anxiety for customers. To provide more range, vehicle manufacturers may rely on larger battery packs comprised of individual battery cells with higher energy density compared to the battery cells used for shorter range BEVs and other electrified vehicles, such as hybrid electric vehicles (REV, including full hybrids and plug-in hybrids.

Electrified vehicles rely on a high voltage traction battery to provide power for propulsion. Various properties and/or parameters of the battery may be monitored to control battery charging/discharging and vehicle operation. Battery power capability provides an indication of how much power the battery may supply or absorb at any particular time, while battery state of charge (SOC) provides an indication of the amount of charge stored in the battery. Battery properties and/or parameters may be measured or otherwise determined directly or indirectly. Battery voltages and currents may be measured directly using sensors. Other battery properties may require that one or more parameters of the battery be estimated first. The estimated parameters may include resistances, capacitances, and voltages associated with the battery. The battery properties may then be calculated from the estimated battery parameters.

Model-based estimators are often used to describe various battery conditions, including state of charge (SOC) and state of power. Many prior art strategies are available for estimating the battery parameters, including implementing a Kalman filter model to recursively estimate the model parameters. This representation blends well-understood, simple models and real-time corrections based on measurements and requires initialization conditions. When a battery is allowed to rest after polarization, i.e., when input current is zero, the battery voltage does not immediately return to the open circuit voltage (OCV), but decays gradually due to slow electrochemical diffusion processes in the cells until achieving electrochemical equilibrium. This phenomenon is much slower in cells with high energy density and may impact accuracy of SOC and state of power determinations after rest.

SUMMARY

In at least one embodiment, a vehicle comprises a traction battery having a plurality of cells, a temperature sensor configured to measure battery temperature of the traction battery, an electric machine powered by the traction battery and configured to provide propulsive power to the vehicle, and a controller configured to control at least one of the electric machine and the traction battery using an estimated battery power capability or estimated battery state of charge based on an estimate initialized upon requesting activation of the traction battery with an open circuit voltage that varies based on elapsed time from the traction battery becoming inactive. The estimate may be from a battery model. The open circuit voltage may be initialized to a value that varies as an exponential function of the elapsed time. The initial value of the open circuit voltage may vary based on a change of the battery temperature during the elapsed time from the traction battery becoming inactive. The battery model may include a first resistance, a second resistance in series with the first resistance, and a capacitance in parallel with the second resistance. The voltage across the capacitance may be initialized to a value that varies as an exponential function of the elapsed time. The initial values for the second resistance and the capacitance may vary based on a representative value for the battery temperature during the elapsed time. The representative value for the battery temperature during the elapsed time may correspond to an average of the battery temperature when the battery became inactive and the battery temperature when the battery activation is requested. The representative value for the battery temperature during the elapsed time may correspond to a weighted average of the battery temperature when the battery became inactive and the battery temperature when the battery activation is requested.

In one embodiment, the representative value for the battery temperature during the elapsed time corresponds to an average of the battery temperature when the battery became inactive and the battery temperature when the battery activation is requested if the difference between the battery temperature when the battery became inactive and the battery temperature when the battery activation is requested is less than an associated threshold. The representative value for the battery temperature during the elapsed time corresponds to a weighted average of the battery temperature when the battery became inactive and the battery temperature when the battery activation is requested if the difference between the battery temperature when the battery became inactive and the battery temperature when the battery activation is requested is greater than the associated threshold.

Embodiments may include a system comprising an electric machine powered by a high voltage battery and a controller configured to close a battery contactor in response to an activation request after initializing one or more parameters for the high voltage battery including a first resistance in series with a second resistance and a capacitance in parallel to the second resistance, wherein the second resistance and the capacitance are initialized based on a representative temperature of the high voltage battery during elapsed time from high voltage battery inactivation, and a capacitance voltage that varies with the elapsed time. The representative temperature may correspond to an average of a first measured high voltage battery temperature at the inactivation and a second measured high voltage battery temperature at the activation request. The average may be a weighted average if a difference between the first and second measured temperatures exceeds an associated threshold. The capacitance voltage may vary as an exponential function of the elapsed time. The controller may be further configured to control at least one of the electric machine and the high voltage battery using a state of charge of the high voltage battery based on an open-circuit voltage, which is based on the capacitance voltage.

Embodiments also include a method for controlling an electrified vehicle having an electric machine powered by a traction battery, comprising, by a controller, initializing traction battery parameters for a first resistance, a second resistance, and a capacitance in response to a vehicle key-on and controlling at least one of the electric machine and the traction battery using a battery state of charge (SOC) estimated using a traction battery model including the first resistance in series with the second resistance and the capacitance in parallel to the second resistance, wherein a voltage across the capacitance is initialized based on a function of elapsed time from inactivation of the traction battery. The function of elapsed time may comprise an exponential function of elapsed time. The second resistance and the capacitance may be based on a representative temperature of the traction battery during the elapsed time. The representative temperature may comprise an average of a first traction battery temperature measured at the inactivation and a second traction battery temperature measured at the vehicle key-on. The average may comprise a weighted average if the difference between the first and second temperatures exceeds an associated threshold. The method may also include storing a current SOC, measured temperature of the traction battery, and a timestamp in response to the inactivation of the traction battery.

Embodiments of the disclosure may provide one or more associated advantages. For example, one or more embodiments account for the electrochemical dynamics of the battery while at rest, i.e. between being inactive with zero current and subsequently activated after an elapsed time. Consideration of the diffusion voltage decay as represented by the RC time constant of the battery model facilitates computation of better estimates for the initial conditions to be used by the estimator, e.g., a Kalman filter. Better initial conditions result in improved estimation behavior that generally favors slow changes over fast changes to model parameter values. By initializing the estimator with initial conditions that more accurately reflect the actual state of the battery, the convergence of the estimator is much faster and robust than many other previous strategies. Consideration of the diffusion voltage decay when defining the initial conditions of the battery states may also improve estimation of the open-circuit voltage estimation, which results in a more accurate initial SOC estimation.

In addition, because the battery temperature affects the battery rate of voltage decay, embodiments according to this disclosure account for the temperature of the battery at model initialization and the change in temperature since the last battery activity. Various embodiments provide a weighted average to combine the temperature at initialization and the temperature at the end of the drive cycle with weights depending on the difference between these two temperatures.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure recognizes that various prior art strategies for state of charge (SOC) and state of power (also known as power capability) use equivalent circuit models to mathematically describe the dynamics of a battery that are usually obtained through fitting methods applied to theoretical or empirical response profiles of the battery cell. Model parameters may be organized in high dimension look-up tables accounting for their dependence with respect to input current, temperature, and SOC, for example. However, these approaches often neglect the diffusion voltage regardless of the amount of time the battery is at rest, which is appropriate only if enough time (e.g. an hour, but varies with cell chemistry) has passed since the battery was active. If insufficient time has passed and there is still a non-zero diffusion voltage, but the voltage measured at the terminals is erroneously assumed to be equal to the open-circuit voltage (OCV), the SOC is then initialized based on an incorrect OCV. In the case where the time elapsed is short, the diffusion voltage is still initialized as zero, and the state of charge is initialized as the last estimated value. However, the time required for the battery to be in electrochemical equilibrium can be very long for high energy density cells. As such, these prior art approaches may have initially inaccurate SOC and state of power estimates and may require longer for convergence of recursive estimation techniques, such as use of a Kalman filter, for example.

Embodiments of this disclosure provide a novel approach for initializing the estimator model states based on the battery dynamics to improve initial estimation and provide faster convergence for recursive estimator strategies.

Figure 1:
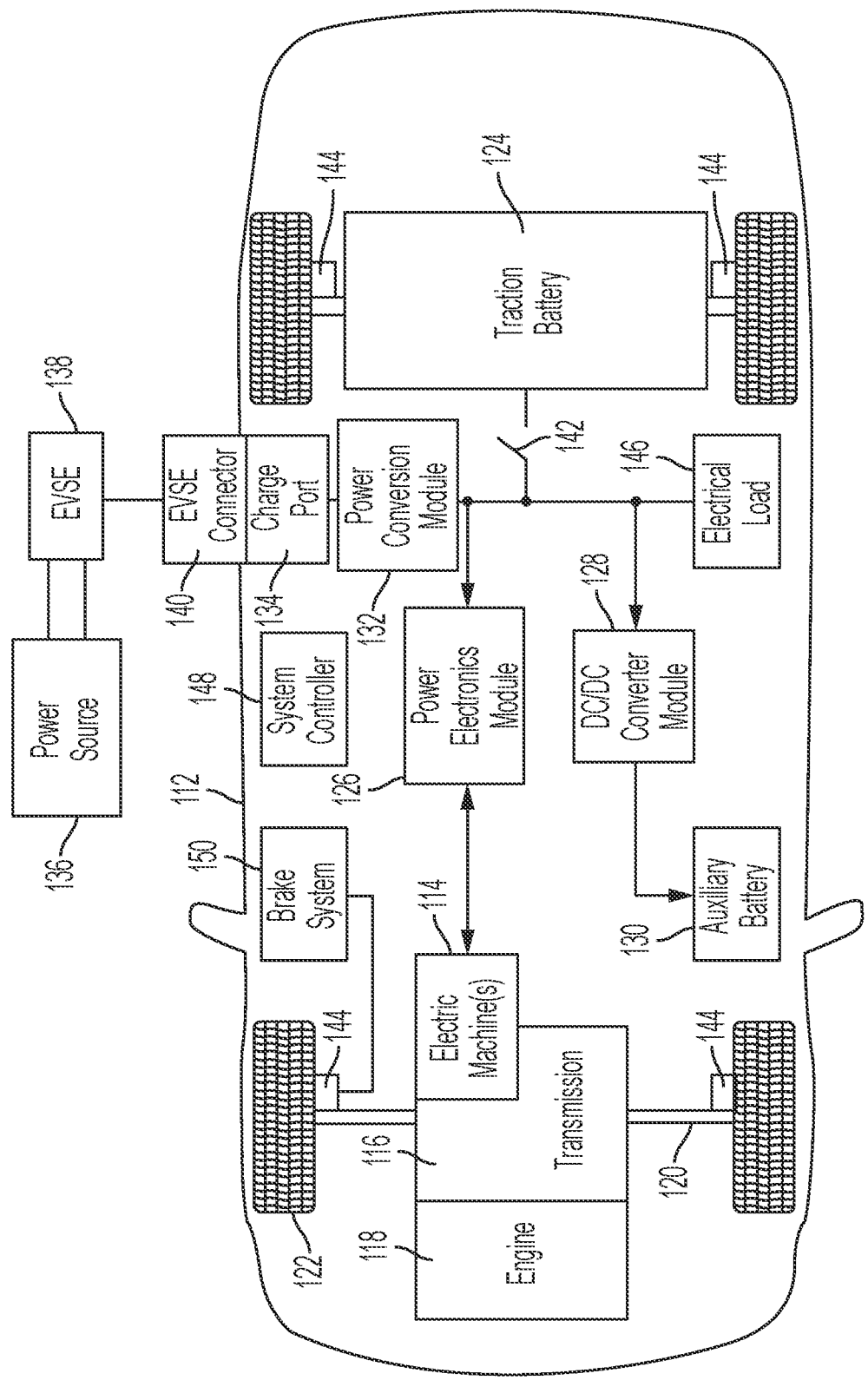
FIG. 1 is a diagram of a representative electrified vehicle with battery parameter initialization based on cell diffusion processes.

FIG. 1 depicts a representative electrified vehicle, which is a plug-in hybrid electric vehicle (HEV) in this example. Vehicle 112 may comprise one or more electric machines 114 mechanically connected to a transmission 116. The electric machines 114 may be capable of operating as a motor or a generator. In addition, the transmission 116 is mechanically connected to an internal combustion engine 118. The transmission 116 is also mechanically connected to a drive shaft 20 that is mechanically connected to the wheels 122. The electric machines 114 can provide propulsion and regenerative braking capability when the engine 118 is turned on or off. During regenerative braking, the electric machines 114 act as generators and can provide fuel economy benefits by recovering energy that would normally be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that can be used by the electric machines 114. A vehicle battery pack 124 typically provides a high voltage DC output. The traction battery 124 is electrically connected to one or more power electronics modules. One or more contactors 142 may isolate the traction battery 124 from other components when opened and connect the traction battery 124 to other components when closed. A power electronics module 126 is also electrically connected to the electric machines 114 and provides the ability to bi-directionally transfer energy between the traction battery 124 and the electric machines 114. For example, a typical traction battery 124 may provide a DC voltage while the electric machines 114 may require a three-phase AC current to function. The power electronics module 126 may convert the DC voltage to a three-phase AC current as required by the electric machines 114. In a regenerative mode, the power electronics module 126 may convert the three-phase AC current from the electric machines 114 acting as generators to the DC voltage required by the traction battery 124. The description herein is equally applicable to a pure electric vehicle, often referred to as a battery electric vehicle (BEV). For a pure electric vehicle, the hybrid transmission 116 may be a gear box connected to an electric machine 114 and the engine 118 may not be present.

In addition to providing energy for propulsion, the traction battery 124 may provide energy for other vehicle electrical systems. A typical system may include a DC/DC converter module 128 that converts the high voltage DC output of the traction battery 124 to a low voltage DC supply that is compatible with other vehicle loads. Other high-voltage loads, such as compressors and electric heaters, may be connected directly to the high-voltage without the use of a DC/DC converter module 128. The low-voltage systems may be electrically connected to an auxiliary battery 130 (e.g., 12V battery).

The electrified vehicle 112 may be an electric vehicle or a plug-in hybrid vehicle in which the traction battery 124 may be recharged by an external power source 136. The external power source 136 may be a connection to an electrical outlet. The external power source 136 may be electrically connected to electric vehicle supply equipment (EVSE) 138. The EVSE 138 may provide circuitry and controls to regulate and manage the transfer of energy between the power source 136 and the vehicle 112. In other embodiments, the vehicle 112 may employ wireless charging, which may be referred to as hands-free or contactless charging that uses inductive or similar wireless power transfer.

The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically connected to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically connected may transfer power using a wireless inductive coupling as previously described.

One or more wheel brakes 144 may be provided for friction braking of the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components that are required to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 to achieve desired operation. The brake system 150 may respond to driver commands and may also operate autonomously to implement features such as stability control. The controller of the brake system 150 may implement a method of applying a requested brake force when requested by another controller or sub-function.

One or more electrical loads 146 may be connected to the high-voltage bus. The electrical loads 146 may have an associated controller that operates the electrical load 146 when appropriate. Examples of electrical loads 146 may be a heating module or an air-conditioning module.

The various components discussed may have one or more associated controllers to control and monitor the operation of the components. The controllers may communicate via a serial bus (e.g., Controller Area Network (CAN)) or via discrete conductors. In addition, a system controller 148 may be present to coordinate the operation of the various components.

A traction battery 124 may employ a variety of chemical formulations. Typical battery pack chemistries may be lead-acid, nickel-metal hydride (NIMH), or lithium-ion having a series configuration of N battery cells. Other battery packs may be composed of any number of individual battery cells connected in series or parallel or some combination thereof. A typical system may have one or more system controllers 148, such as a Battery Energy Control Module (BECM) that monitors and controls the performance of the traction battery 124. The BECM may monitor several battery pack level characteristics such as pack current, pack voltage, and pack temperature. The BECM may have non-volatile memory such that data may be retained when the BECM is in an off condition. Retained data may be available upon the next key cycle. In one or more embodiments, the last estimated SOC, diffusion voltage, measured battery temperature, and timestamp are stored when the battery is inactive for subsequent use in response to a reactivation request, such as a vehicle key-on. Various conditions may be monitored to determine an inactive state, such as zero current flow to/from the traction battery 124 and/or key state, for example.

In addition to the pack level characteristics, there may be battery cell level characteristics that are measured and monitored. For example, the terminal voltage, current, and temperature of each cell may be measured. A system may use a sensor module to measure the battery cell characteristics. Depending on the capabilities, the sensor module may measure the characteristics of one or multiple of the battery cells.

Various embodiments measure, calculate or otherwise determine various characteristics, properties, and/or parameters of the battery pack to control operation of the battery pack and/or the vehicle. Quantities such as battery power capability and battery state of charge (SOC) may be used for controlling the operation of the battery pack during charging/discharging while the vehicle is operating as well as any electrical loads receiving power from the battery pack. Battery power capability provides an indication of the amount of power the battery can provide or the amount of power that the battery can receive or store. The battery power capability may be used to manage electrical loads such that the power requested is within desired limits for the particular battery or operating conditions.

Battery pack state of charge (SOC) provides an indication of the amount of charge remaining in the battery pack. The battery pack SOC may be output or broadcast by the vehicle network to inform the driver of remaining charge and/or estimated travel distance, similar to a fuel gauge. The battery pack SOC may also be used to control the operation of an electric or hybrid-electric vehicle. Calculation of battery pack SOC can be accomplished by a variety of methods. One possible method of calculating battery SOC is to perform an integration of the battery pack current over time. This is well-known in the art as ampere-hour (or amp-hour) integration. One possible disadvantage to this method is that the current measurement may be noisy, biased, or otherwise have limited accuracy/resolution. Possible inaccuracy in the SOC may occur due to the integration of this noisy signal over time.

Figure 2:
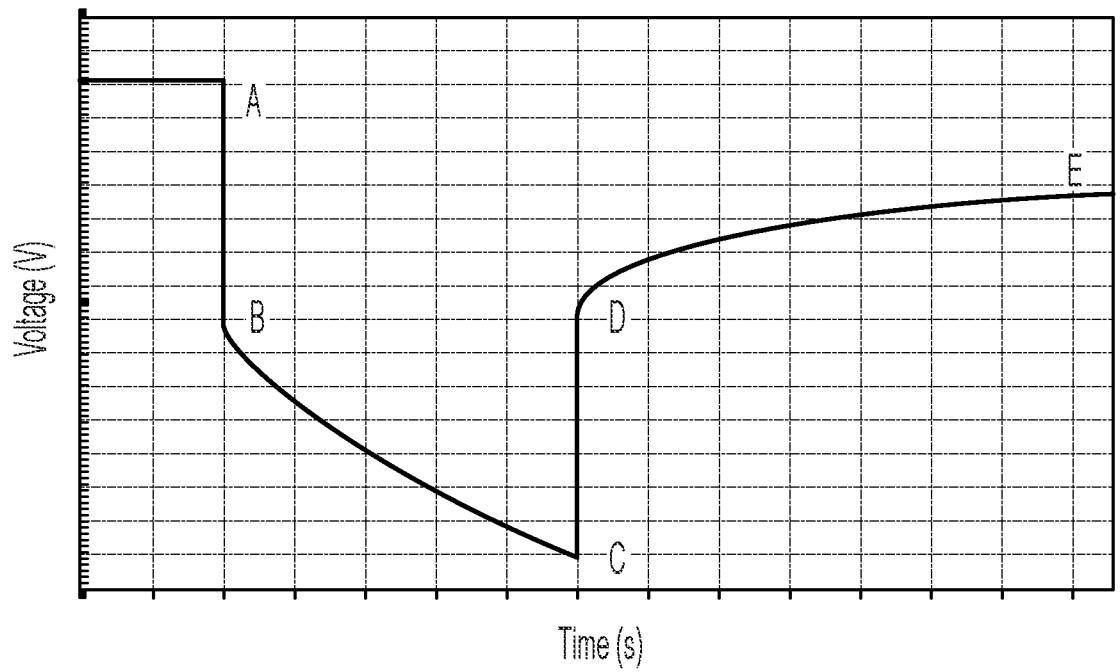
FIG. 2 illustrates the effect of cell diffusion on voltage in a representative high density cell.

FIG. 2 depicts an output voltage response as a function of time for a lithium-ion battery cell when a pulse input current is applied. When a battery is allowed to rest after polarization, i.e., when input current is zero, the battery voltage does not immediately return to the open circuit (OC) voltage, but decays gradually due to slow diffusion processes in the cell as generally indicated between D-E in the representative curve of FIG. 2. This phenomenon is known to be much slower in cells with high energy density, such as those used in traction battery packs of electrified vehicles to provide longer range. In contrast to various prior art strategies, embodiments according to this disclosure account for such slow decay (rather than assuming steady state) when initializing model-based estimators for SOC and state of power.

Figure 3:
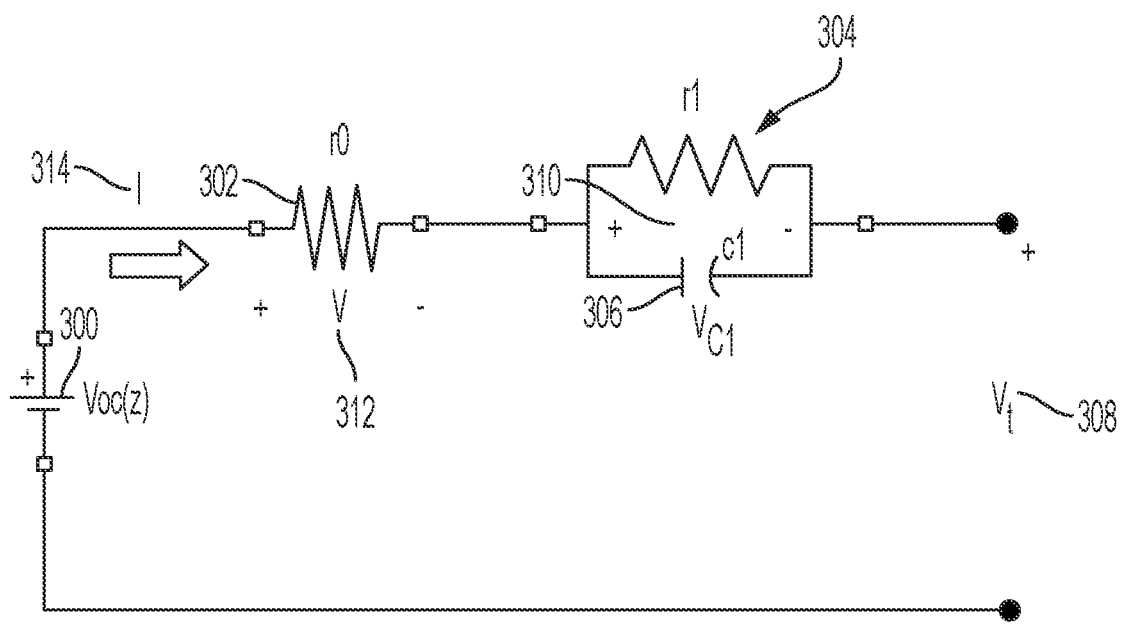
FIG. 3 is a diagram of an example battery cell equivalent circuit.

A battery cell may be modeled as an equivalent circuit. FIG. 3 shows one possible battery cell equivalent circuit model (ECM). A battery cell may be modeled as a voltage source (Voc) 300 having associated first and second resistances 302, 304 and capacitance 306. Voc 300 represents the open-circuit voltage of the battery. The model includes an internal resistance, r0 302, a charge transfer resistance r1 304, and a double layer capacitance c1 306. The voltage V1 312 is the voltage drop across the internal resistance 302 due to current 314 flowing through the battery. The voltage $V_{c_1}$ 310 is the voltage drop across the parallel combination of r1 and c1 due to current 314 flowing through the combination. The voltage Vt 308 is the voltage across the terminals of the battery (terminal voltage).

Because of the battery cell impedance, the terminal voltage, Vt 308, may not be the same as the open-circuit voltage, Voc 300. The open-circuit voltage, Voc 300, may not be readily measurable as only the terminal voltage 308 of the battery cell is accessible for measurement. When no current 314 is flowing for a sufficiently long period of time, the terminal voltage 308 may be the same as the open-circuit voltage 300 as explained in greater detail below. A sufficiently long period of time may be necessary to allow the internal dynamics of the battery to reach a steady state. When current 314 is flowing, Voc 300 may not be readily measurable and the value may need to be inferred based on the circuit model. The impedance parameter values, r0, r1, and c1 may be known or unknown. The value of the parameters may depend on the battery chemistry. While the representative embodiment illustrated uses a relatively simple equivalent circuit model, a higher order equivalent circuit model having more RC pairs may be used.

In the representative model illustrated in FIG. 3, the representation of open-circuit voltage Voc 300 is a function of the SOC, internal resistance r0, and diffusion time constant (r1*c1). As described in greater detail below, control of the vehicle may include initializing traction battery model parameters for at least the second resistance (r1), the capacitance (c1), and the diffusion voltage $V_{c_1}$ in response to a request for battery activation, such as a vehicle key-on, for example, and controlling at least one of the electric machine 114 and the traction battery 124 in response to a battery state of charge (SOC) or a battery power capability estimated using the battery model including the first resistance (r0) in series with the second resistance (r1) and the capacitance (c1) in parallel to the second resistance (r1).

The model states at a particular time t are defined as $x(t)=[z(t)\ v_{c_1}(t)]$ where $z(t)$ represents the SOC and $v_{c_1}(t)$ represents the diffusion voltage. The output voltage is computed as:

$$v_T(t)=v_{oc}(z(t))-v_{c_1}(t)-r_0 I(t) \quad (1)$$

The SOC z is computed by integrating current over the length of the drive cycle as:

$$z(t) = z(t_0) - \frac{1}{Q}\int_{t_0}^{t_f} I(\tau)d\tau \quad (2)$$

The open-circuit voltage $v_{oc}$ may be retrieved from a look-up table based on the SOC z. The voltage across the RC-pair is computed as follows:

$$\dot{v}_{c_1}(t) = -\frac{1}{r_1 c_1}v_{c_1}(t) + \frac{1}{c_1}I(t) \quad (3)$$

When the battery is at rest, the current flowing through the battery is zero and, therefore, the voltage measured at the terminals of the battery can be approximated as:

$$v_T(t)=v_{oc}(z(t=t_f))-v_{c_1}(t) \quad (4)$$

As shown in equation (4), the only term that is a function of time is $v_{c_1}$. The open-circuit voltage becomes a constant, where its value is a function of the state of charge when the battery became inactive.

The decay of $v_{c_1}$ as a function of elapsed time from when the battery was active (or became inactive) may be represented by:

$$v_{c_1}(t) = v_{c_1}(t_f)e^{-\frac{t}{r_1 c_1}} \quad (5)$$

where $t_f$ is the time at the end of the drive cycle, i.e., the time at which the vehicle becomes inactive.

While many previous strategies neglect the diffusion voltage regardless of the amount of time the battery is at rest, embodiments of this disclosure use the results of equations (4) and (5) to account for diffusion voltage when initializing the estimation algorithm, such as a Kalman Filter, in response to a subsequent request for the battery to become active.

Figure 4:
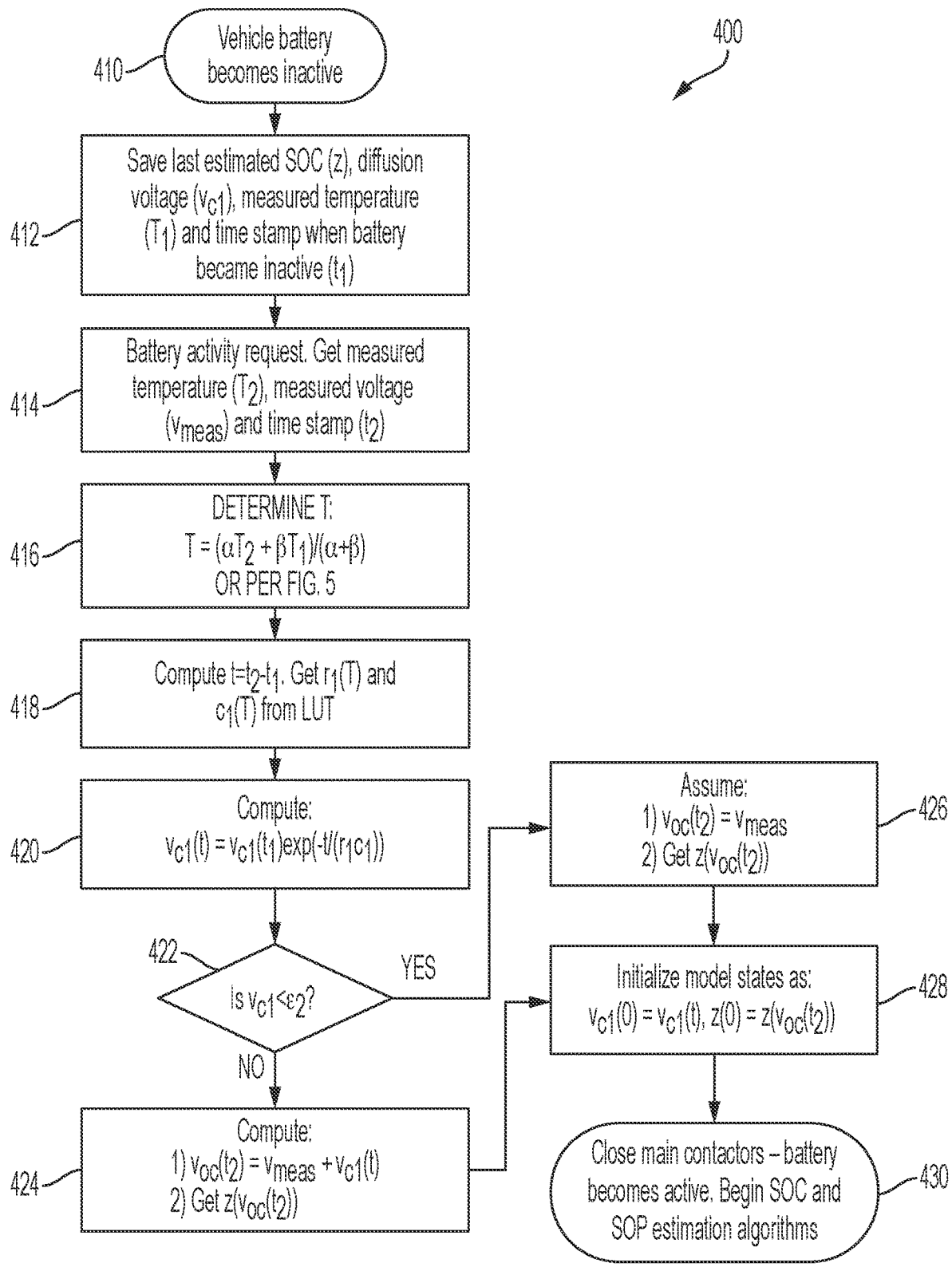
FIG. 4 is a flowchart illustrating operation of a system or method for controlling an electrified vehicle using a model-based estimator with initialization parameters accounting for cell diffusion processes.

FIG. 4 is a flowchart illustrating operation 400 of a system or method for controlling an electrified vehicle using a model-based estimator with initialization parameters accounting for cell diffusion processes. The process begins at 410 when the battery first transitions from an active to an inactive state. This may be determined based on various vehicle operating conditions or modes, such as key-off and zero battery current, for example. Values for the current/last SOC, diffusion voltage, measured battery temperature, and timestamp are stored in one or more memories as represented at 412. In response to a subsequent battery activation or activity request, new values are obtained corresponding to a measured battery temperature, measured terminal voltage, and the timestamp as indicated at 414. Next, a representative temperature (T) is calculated or determined for the battery rest period, i.e. the elapsed time from when the battery became inactive as indicated at 416. The representative temperature may be calculated using a calibratable weighting equation or a weighted average of the previously stored battery temperature upon entering the inactive state and the current battery temperature. Alternatively, the representative temperature T may be determined as illustrated and described with reference to FIG. 5. The weights for the current (active) temperature represented by α and the previously stored (inactive) temperature represented by β may be retrieved from a lookup table (LUT) based on the elapsed time. For example, the representative equation of block 416 may be calibrated to favor the initial temperature if a short time has passed or the final temperature if a long time has passed. This representative temperature T is then used with another lookup table to determine the diffusion voltage decay parameters $r_1$ and $c_1$ as indicated at 418.

The voltage across the RC pair $v_{c_1}$ is calculated at 420 according to equation (5) described above using, the elapsed time the battery was at rest, and the diffusion voltage decay parameters. If the voltage $v_{c_1}$ is below an associated threshold $\varepsilon_2$ at 422 (e.g. within measurement accuracy or precision), the voltage can be neglected in equation (4) as indicated at 426 and also while calculating the SOC. Otherwise, the voltage is used in equation (4) as shown at 424. The model states are then initialized using the calculated diffusion voltage $v_{c_1}$, OCV (if needed), and SOC as indicated at 428. The main battery contactors are then closed such that the battery becomes active and the SOC and state of power estimation algorithms are started using the initialized values as represented at 430.

Figure 5:
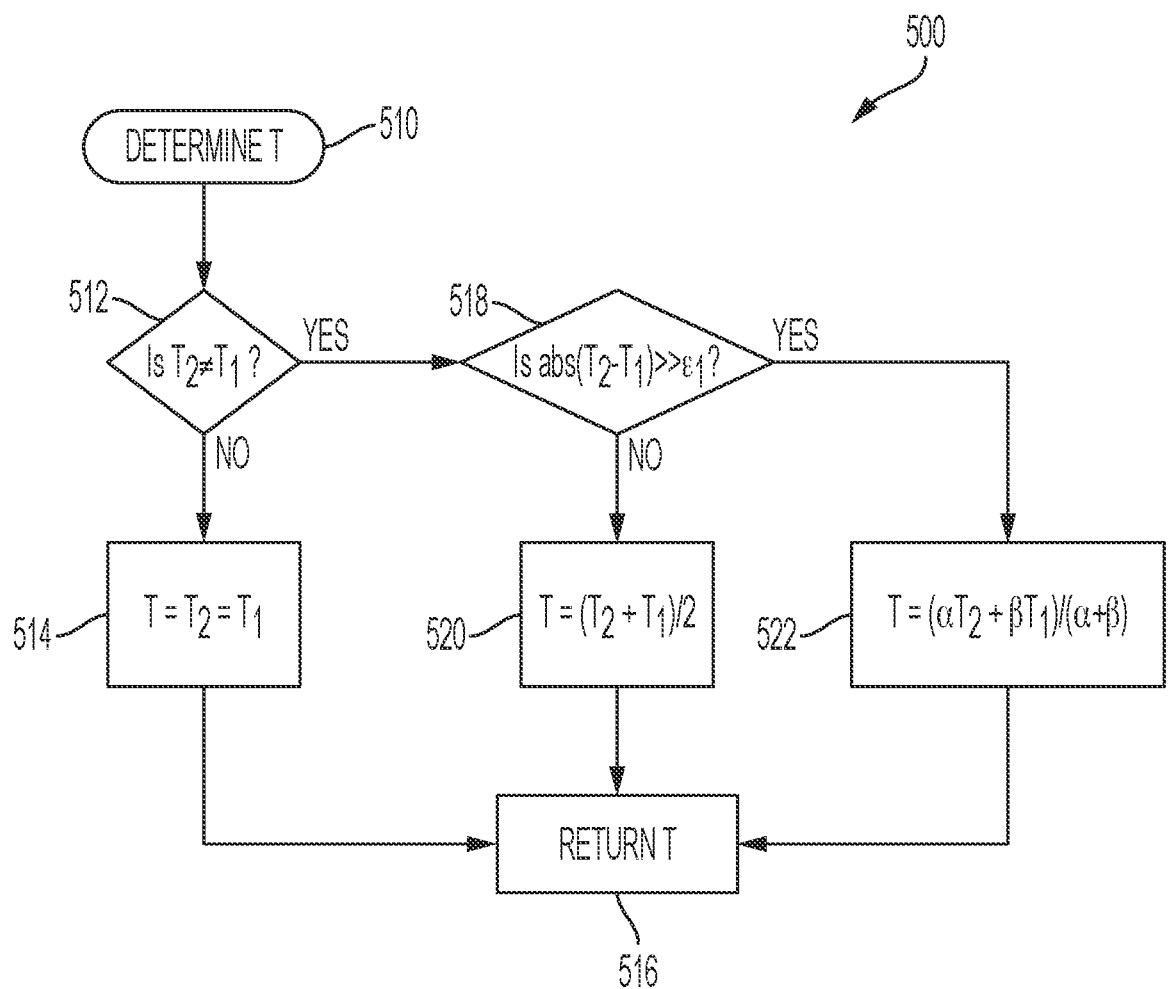
FIG. 5 is a flowchart illustrating an alternative determination of battery temperature for use in a model-based estimator strategy as shown in FIG. 4.

FIG. 5 is a flowchart 500 illustrating an alternative determination of a representative battery temperature T in block 416 for use in a model-based estimator strategy as shown in FIG. 4. The representative temperature T is set equal to the initial and final measured battery rest temperatures at 514 if both temperatures are the same as determined at block 512. The representative temperature T is then returned for use at 516. If the difference between the initial and final measured battery temperatures is less than an associated threshold at 518, then the temperatures are averaged at 520. If the difference between the initial and final measured battery temperatures is greater than the associated threshold $\varepsilon\_1$ at 518, then a calibratable weighting equation or weighted average can be used as represented at 522. For example, this equation can be calibrated to favor the initial temperature if a short time has passed or the final temperature if a long time has passed.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable and non-transitory storage media such as ROM devices and information alterably stored on writeable, non-transitory storage media such magnetic disks or tapes, solid-state memory or drives, CDs, RAM devices, flash memory and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a traction battery having a plurality of cells;
    a temperature sensor configured to measure battery temperature of the traction battery;
    an electric machine powered by the traction battery and configured to provide propulsive power to the vehicle; and
    a controller configured to control at least one of the electric machine and the traction battery using an estimated battery state of charge initialized upon requesting activation of the traction battery using an open circuit voltage that varies based on elapsed time from the traction battery becoming inactive.

2. The vehicle of claim 1 wherein the open circuit voltage varies as an exponential function of the elapsed time.

3. The vehicle of claim 2 wherein the open circuit voltage varies based on a change of the battery temperature during the elapsed time from the traction battery becoming inactive.

4. The vehicle of claim 1 wherein the estimated battery state of charge is based on a battery model comprising a first resistance, a second resistance in series with the first resistance, and a capacitance in parallel with the second resistance, and wherein the initial voltage across the capacitance varies as an exponential function of the elapsed time.

5. The vehicle of claim 4 wherein the initial values for the second resistance and the capacitance vary based on a representative value for the battery temperature during the elapsed time.

6. The vehicle of claim 5 wherein the representative value for the battery temperature during the elapsed time corresponds to an average of the battery temperature when the battery became inactive and the battery temperature when the battery activation is requested.

7. The vehicle of claim 5 wherein the representative value for the battery temperature during the elapsed time corresponds to a weighted average of the battery temperature when the battery became inactive and the battery temperature when the battery activation is requested.

8. The vehicle of claim 5 wherein the representative value for the battery temperature during the elapsed time corresponds to an average of the battery temperature when the battery became inactive and the battery temperature when the battery activation is requested if the difference between the battery temperature when the battery became inactive and the battery temperature when the battery activation is requested is less than an associated threshold.

9. The vehicle of claim 8 wherein the representative value for the battery temperature during the elapsed time corresponds to a weighted average of the battery temperature when the battery became inactive and the battery temperature when the battery activation is requested if the difference between the battery temperature when the battery became inactive and the battery temperature when the battery activation is requested is greater than the associated threshold.

10. A system comprising:
an electric machine powered by a high voltage battery; and
a controller configured to, in response to an activation request:
initialize the high voltage battery based on an estimated first resistance, the estimated first resistance in series with: (1) a second resistance; and (2) a capacitance in parallel with the second resistance, wherein the second resistance and the capacitance are initialized based on: (a) a representative temperature of the high voltage battery during elapsed time from high voltage battery inactivation; and (b) a capacitance voltage that varies with the elapsed time; and
close a battery contactor after initializing the high voltage battery.

11. The system of claim 10 wherein the representative temperature corresponds to an average of a first measured high voltage battery temperature at the inactivation and a second measured high voltage battery temperature at the activation request.

12. The system of claim 11 wherein the average comprises a weighted average if a difference between the first and second measured temperatures exceeds an associated threshold.

13. The system of claim 10 wherein the capacitance voltage varies as an exponential function of the elapsed time.

14. The system of claim 10 wherein the controller is further configured to control at least one of the electric machine and the high voltage battery using a state of charge of the high voltage battery based on an open-circuit voltage, the open-circuit voltage being based on the capacitance voltage.

15. A method for controlling an electrified vehicle having an electric machine powered by a traction battery, comprising, by a controller:
initializing traction battery parameters for a first resistance, a second resistance, and a capacitance in response to a vehicle key-on; and
controlling at least one of the electric machine and the traction battery using a battery state of charge (SOC) estimated using the first resistance in series with; the second resistance in parallel with the capacitance, wherein a voltage across the capacitance is initialized based on a function of elapsed time from inactivation of the traction battery.

16. The method of claim 15 wherein the second resistance and the capacitance are based on a representative temperature of the traction battery during the elapsed time.

17. The method of claim 16 wherein the representative temperature comprises an average of a first traction battery temperature measured at the inactivation and a second traction battery temperature measured at the vehicle key-on.

18. The method of claim 17 wherein the average comprises a weighted average if the difference between the first and second temperatures exceeds an associated threshold.

19. The method of claim 15 further comprising storing a current SOC, measured temperature of the traction battery, and a timestamp in response to the inactivation of the traction battery.

20. The method of claim 15 wherein the function of elapsed time comprises an exponential function of elapsed time.

* * * * *